US012590863B2

(12) United States Patent　(10) Patent No.: US 12,590,863 B2
Satoh et al.　(45) Date of Patent: Mar. 31, 2026

(54) VIBRATION ANALYSIS SYSTEM AND VIBRATION ANALYSIS METHOD

(71) Applicant: VALQUA, LTD., Tokyo (JP)

(72) Inventors: Hisataka Satoh, Gojo (JP); Tetsuya Komeda, Gojo (JP); Yuya Yamashita, Machida (JP)

(73) Assignee: VALQUA, LTD., Tokyo (JP)

( * ) Notice: Subject to any disclaimer, the term of this patent is extended or adjusted under 35 U.S.C. 154(b) by 406 days.

(21) Appl. No.: 18/026,210

(22) PCT Filed: Sep. 13, 2021

(86) PCT No.: PCT/JP2021/033498
§ 371 (c)(1),
(2) Date: Mar. 14, 2023

(87) PCT Pub. No.: WO2022/065103
PCT Pub. Date: Mar. 31, 2022

(65) Prior Publication Data
US 2023/0332979 A1　Oct. 19, 2023

(30) Foreign Application Priority Data

Sep. 25, 2020　(JP) ................................. 2020-160910

(51) Int. Cl.
*G01M 7/02*　(2006.01)
*F04B 51/00*　(2006.01)
(Continued)

(52) U.S. Cl.
CPC ............. *G01M 7/025* (2013.01); *F04B 51/00* (2013.01); *G01M 1/122* (2013.01); *G08B 21/182* (2013.01)

(58) Field of Classification Search
None
See application file for complete search history.

(56) References Cited

U.S. PATENT DOCUMENTS

2004/0064277 A1* 4/2004 Samata .............. G05B 23/0283
702/76
2007/0156373 A1 7/2007 Yamashita et al.
(Continued)

FOREIGN PATENT DOCUMENTS

CN　105300692 A　2/2016
CN　107063427 A　8/2017
(Continued)

OTHER PUBLICATIONS

Office Action from corresponding Taiwanese Application No. 110135478 dated Sep. 23, 2024.
(Continued)

*Primary Examiner* — Matthew G Marini
(74) *Attorney, Agent, or Firm* — Lando & Anastasi, LLP

(57)　ABSTRACT

A vibration analysis system includes: a signal input portion that receives an input of a vibration signal detected by a sensor; an intensity calculation portion that calculates a plurality of signal intensities corresponding to a plurality of frequency bands by analyzing the vibration signal; a first distance calculation portion that calculates a first Mahalanobis distance of a first signal space configured of the plurality of signal intensities with respect to a first unit space; a gravity center calculation portion that calculates two-dimensional gravity center data indicating gravity center positions of the plurality of signal intensities; a second distance calculation portion that calculates a second Mahalanobis distance of a second signal space configured of the gravity center data with respect to a second unit space; and an abnormality prediction portion that predicts an abnormality generation period of the object based on the first Mahalanobis distance and the second Mahalanobis distance.

11 Claims, 14 Drawing Sheets

(51) Int. Cl.
_G01M 1/12_ (2006.01)
_G08B 21/18_ (2006.01)

(56) References Cited

U.S. PATENT DOCUMENTS

| | | | |
|---|---|---|---|
| 2017/0227505 | A1 | 8/2017 | Araki et al. |
| 2020/0285531 | A1 | 9/2020 | Hiroe et al. |
| 2020/0293789 | A1 | 9/2020 | Ito et al. |
| 2021/0255613 | A1 | 8/2021 | Mizobuchi et al. |
| 2022/0347905 | A1 | 11/2022 | Hihara et al. |

FOREIGN PATENT DOCUMENTS

| | | |
|---|---|---|
| CN | 107110743 A | 8/2017 |
| CN | 108760327 A | 11/2018 |
| CN | 110542546 A | 12/2019 |
| CN | 111149129 A | 5/2020 |
| CN | 111259730 A | 6/2020 |
| CN | 111649886 A | 9/2020 |
| CN | 112839775 A | 5/2021 |
| JP | 2000046701 A | 2/2000 |
| JP | 2004117253 A | 4/2004 |
| JP | 2005207644 A | 8/2005 |
| JP | 2007128190 A | 5/2007 |
| JP | 2017142153 A | 8/2017 |
| JP | 2019003389 A | 1/2019 |
| JP | 2019035585 A | 3/2019 |
| JP | 2019117083 A | 7/2019 |
| JP | 2020052460 A | 4/2020 |
| JP | 2020134479 A | 8/2020 |
| WO | 2020009210 A1 | 1/2020 |
| WO | 2021090765 A1 | 5/2021 |

OTHER PUBLICATIONS

International Search Report and Written Opinion from corresponding International Application No. PCT/JP2021/033498 dated Nov. 9, 2021.

Office Action from corresponding Chinese Application No. 2021800651655 dated May 31, 2025.

Office Action from corresponding Chinese Application No. 202180065165.5 dated Sep. 15, 2025.

* cited by examiner

<u>10</u>

PREPARATION PROCESS

S10
ACQUIRE VIBRATION SIGNAL

S12
PERFORM OCTAVE ANALYSIS

S14
STORE REFERENCE DATA

S16
SET UNIT SPACE U1

S18
CALCULATE GRAVITY CENTER DATA

S20
SET UNIT SPACE U2

END

Figure 5:
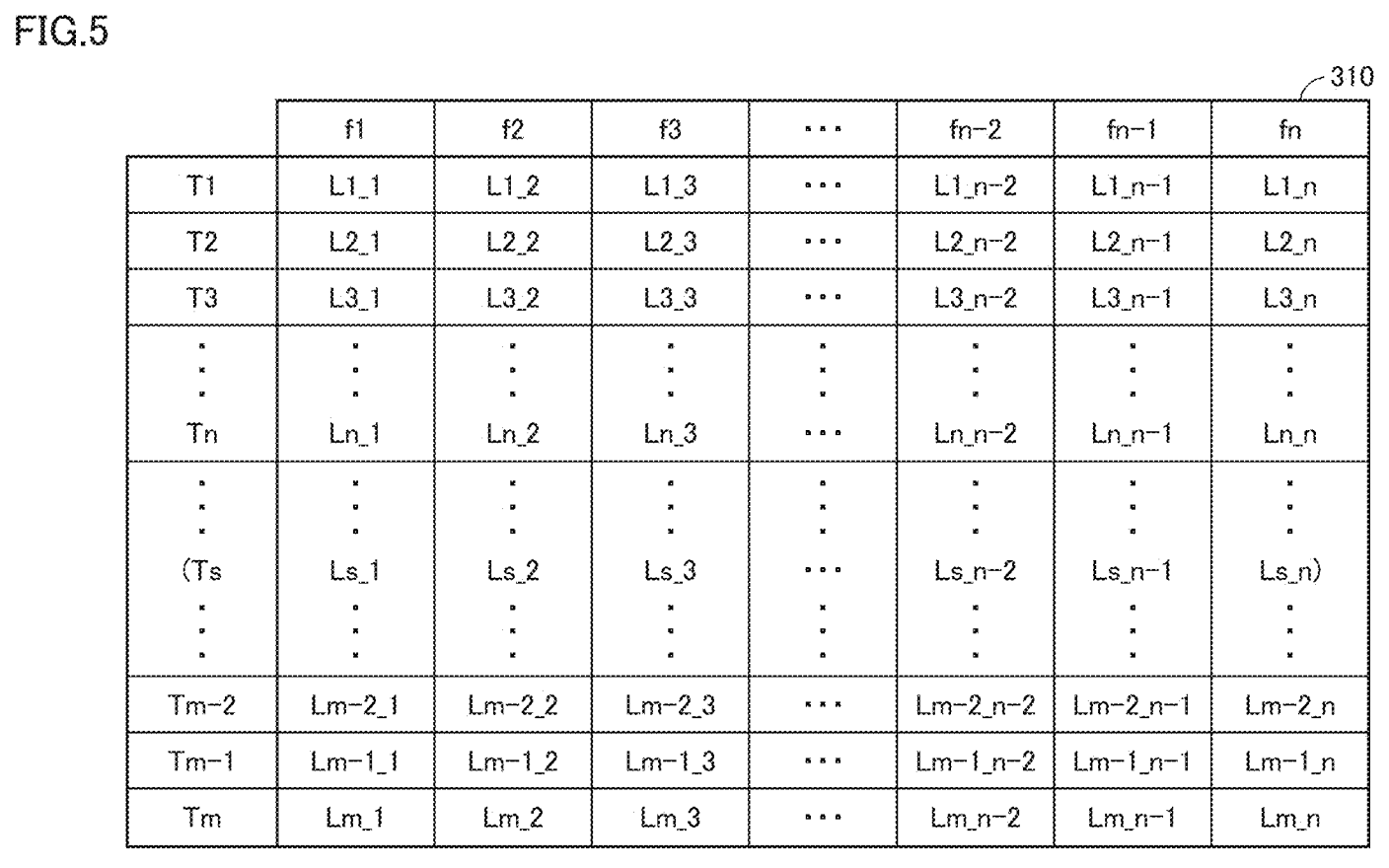

| | f1 | f2 | f3 | ⋮ | fn-2 | fn-1 | fn |
|---|---|---|---|---|---|---|---|
| T1 | L1_1 | L1_2 | L1_3 | ⋮ | L1_n-2 | L1_n-1 | L1_n |
| T2 | L2_1 | L2_2 | L2_3 | ⋮ | L2_n-2 | L2_n-1 | L2_n |
| T3 | L3_1 | L3_2 | L3_3 | ⋮ | L3_n-2 | L3_n-1 | L3_n |
| · · · | · · · | · · · | · · · | · · · | · · · | · · · | · · · |
| Tn | Ln_1 | Ln_2 | Ln_3 | ⋮ | Ln_n-2 | Ln_n-1 | Ln_n |
| · · · | · · · | · · · | · · · | · · · | · · · | · · · | · · · |
| (Ts · · · | Ls_1 | Ls_2 | Ls_3 | ⋮ | Ls_n-2 | Ls_n-1 | Ls_n) |
| · · · | · · · | · · · | · · · | · · · | · · · | · · · | · · · |
| Tm-2 | Lm-2_1 | Lm-2_2 | Lm-2_3 | ⋮ | Lm-2_n-2 | Lm-2_n-1 | Lm-2_n |
| Tm-1 | Lm-1_1 | Lm-1_2 | Lm-1_3 | ⋮ | Lm-1_n-2 | Lm-1_n-1 | Lm-1_n |
| Tm | Lm_1 | Lm_2 | Lm_3 | ⋮ | Lm_n-2 | Lm_n-1 | Lm_n |

FIG.6

| | Gx | Gy |
|---|---|---|
| T1 | Gf_1 | GL_1 |
| T2 | Gf_2 | GL_2 |
| T3 | Gf_3 | GL_3 |
| ⋮ | ⋮ | ⋮ |
| Tn | Gf_n | GL_n |
| ⋮ | ⋮ | ⋮ |
| (Ts | Gf_s | GL_s) |
| ⋮ | ⋮ | ⋮ |
| Tm−2 | Gf_m−2 | GL_m−2 |
| Tm−1 | Gf_m−1 | GL_m−1 |
| Tm | Gf_m | GL_m |

Figure 7:
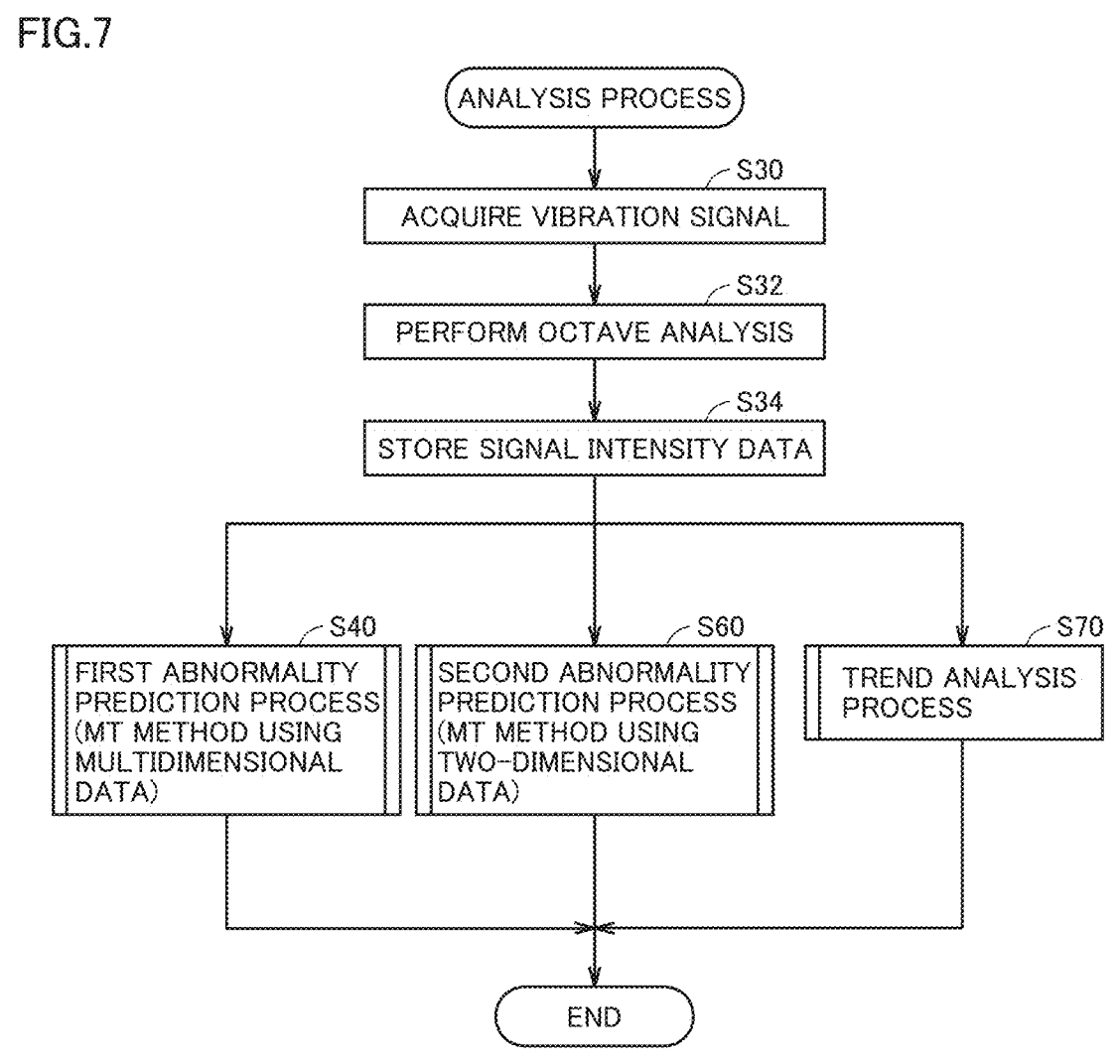

```
        ┌─────────────────────┐
        │  ANALYSIS PROCESS   │
        └─────────────────────┘
                   │
                   │          ⌐S30
                   ▼
        ┌─────────────────────────┐
        │ ACQUIRE VIBRATION SIGNAL│
        └─────────────────────────┘
                   │
                   │          ⌐S32
                   ▼
        ┌─────────────────────────┐
        │  PERFORM OCTAVE ANALYSIS│
        └─────────────────────────┘
                   │
                   │          ⌐S34
                   ▼
        ┌─────────────────────────────┐
        │ STORE SIGNAL INTENSITY DATA │
        └─────────────────────────────┘
```

|                    | S40 | S60 | S70 |
|---|---|---|---|
| | FIRST ABNORMALITY PREDICTION PROCESS (MT METHOD USING MULTIDIMENSIONAL DATA) | SECOND ABNORMALITY PREDICTION PROCESS (MT METHOD USING TWO-DIMENSIONAL DATA) | TREND ANALYSIS PROCESS |

```
                   ▼
        ┌─────────────────────┐
        │        END          │
        └─────────────────────┘
```

VIBRATION ANALYSIS SYSTEM AND VIBRATION ANALYSIS METHOD

CROSS-REFERENCE TO RELATED APPLICATIONS

This application is a U.S. National Stage Application under 35 U.S.C. § 371 of International Application No. PCT/JP2021/033498, filed Sep. 13, 2021, titled VIBRATION ANALYSIS SYSTEM AND VIBRATION ANALYSIS METHOD, which claims priority to Japanese Application No. 2020-160910, filed Sep. 25, 2020. International Application No. PCT/JP2021/033498 is incorporated by reference herein in its entirety.

TECHNICAL FIELD

The present disclosure relates to a vibration analysis system and a vibration analysis method.

BACKGROUND ART

Conventionally, as a technique for inspecting abnormality of a machine, there is known a technique for determining presence or absence of the abnormality of a device by detecting a signal caused by abnormal vibration during operation of the device.

For example, in Japanese Patent Laying-Open No. 2019-35585 (PTL 1), abnormality determination processing based on a predetermined proximity method for calculating an index value representing a degree of whether the abnormality exists based on a distance between data and determining whether the abnormality exists is applied to each data of a new analysis result data group with respect to an existing representative data group representing an existing analysis result data group.

CITATION LIST

Patent Literature

PTL 1: Japanese Patent Laying-Open No. 2019-35585

SUMMARY OF INVENTION

Technical Problem

PTL 1 studies appropriate selection of representative data used for the abnormality detection from a large number of data that are a state monitoring result of the target device. However, there is no disclosure or suggestion about a configuration for predicting the abnormality period for predictive maintenance of the device or the like.

An object of one aspect of the present disclosure is to provide a vibration analysis system and a vibration analysis method capable of predicting an abnormality generation period of an object by analyzing a vibration state of the object.

Solution to Problem

A vibration analysis system according to an embodiment includes: a signal input portion that receives an input of a vibration signal detected by a sensor attached to an operating object; an intensity calculation portion that calculates a plurality of signal intensities corresponding to a plurality of frequency bands by analyzing the vibration signal corresponding to the object; a first distance calculation portion that calculates a first Mahalanobis distance of a first signal space configured of the plurality of signal intensities with respect to a previously-set first unit space; a gravity center calculation portion that calculates two-dimensional gravity center data indicating gravity center positions of the plurality of signal intensities calculated by the intensity calculation portion; a second distance calculation portion that calculates a second Mahalanobis distance of a second signal space configured of the two-dimensional gravity center data with respect to a previously-set second unit space; and an abnormality prediction portion that predicts an abnormality generation period at which an abnormality is generated in the object based on the first Mahalanobis distance and the second Mahalanobis distance.

Preferably, the first unit space is configured of the plurality of signal intensities corresponding to the plurality of frequency bands, the plurality of signal intensities being calculated by analyzing the vibration signal corresponding to the object at a normal time. The second unit space is configured of the two-dimensional gravity center data indicating the gravity center positions of the plurality of signal intensities constituting the first unit space.

Preferably, the abnormality generation period when the first Mahalanobis distance greater than or equal to a first threshold is calculated is predicted to be a nearer future than the abnormality generation period when the first Mahalanobis distance greater than or equal to the first threshold is not calculated.

Preferably, the abnormality prediction portion predicts that the abnormality is generated in the object several days after the first Mahalanobis distance greater than or equal to the first threshold is calculated.

Preferably, the abnormality generation period when the first Mahalanobis distance greater than or equal to the first threshold is calculated and when the second Mahalanobis distance greater than or equal to a second threshold is calculated is predicted to be a nearer future than the abnormality generation period when the first Mahalanobis distance greater than or equal to the first threshold is calculated and the second Mahalanobis distance greater than or equal to the second threshold is not calculated.

Preferably, the abnormality prediction portion predicts that the abnormality is generated in the object several hours after the second Mahalanobis distance greater than or equal to the second threshold is calculated.

Preferably, the vibration analysis system further includes an output control portion that outputs first warning information when the first Mahalanobis distance greater than or equal to the first threshold is calculated, and outputs second warning information having a larger warning level than the first warning information when the second Mahalanobis distance greater than or equal to the second threshold is calculated.

Preferably, the output control portion causes a display to display time-series data of the first Mahalanobis distance and time-series data of the second Mahalanobis distance.

A vibration analysis method according to another embodiment includes: receiving an input of a vibration signal detected by a sensor attached to an operating object; calculating a plurality of signal intensities corresponding to a plurality of frequency bands by analyzing the vibration signal corresponding to the object; calculating a first Mahalanobis distance of a first signal space configured of the plurality of signal intensities with respect to a previously-set first unit space; calculating two-dimensional gravity center data indicating gravity center positions of the calculated plurality of signal intensities; calculating a second Mahalanobis distance of a second signal space configured of the two-dimensional gravity center data with respect to a previously-set second unit space; and predicting an abnormality generation period at which an abnormality is generated in the object based on the first Mahalanobis distance and the second Mahalanobis distance.

Advantageous Effects of Invention

According to the present disclosure, the abnormality generation period of the object can be predicted by analyzing the vibration state of the object.

BRIEF DESCRIPTION OF DRAWINGS

FIG. 5 is a view illustrating an example of a data set of a signal intensity in each frequency band.

FIG. 6 is a view illustrating an example of the data set of a gravity center position.

FIG. 7 is a flowchart illustrating an example of an analysis process.

DESCRIPTION OF EMBODIMENTS

Figure 1:
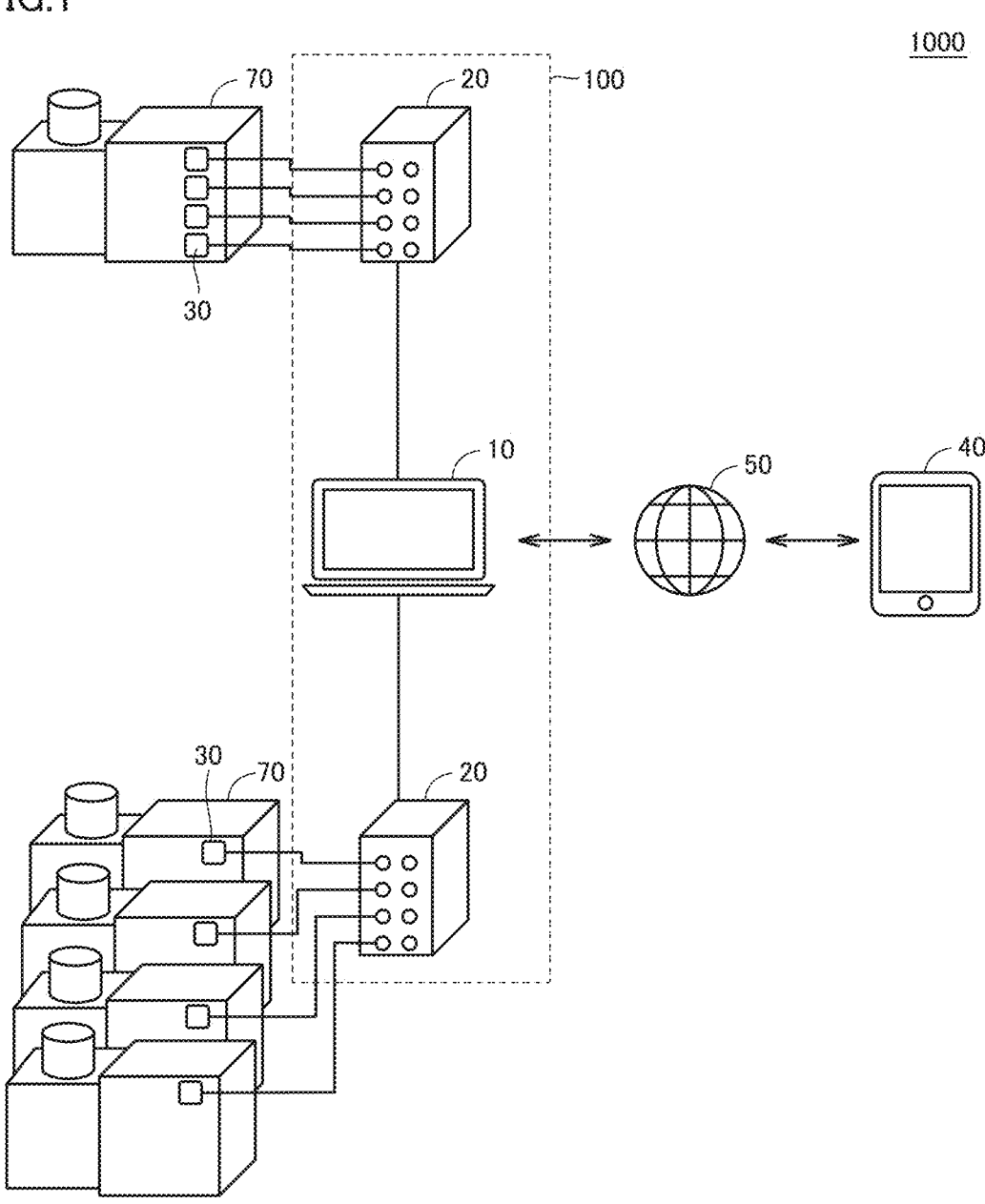
FIG. 1 is a view illustrating an outline of a system.

With reference to the drawings, embodiments according to the present disclosure will be described below. In the following description, the same components are denoted by the same reference numerals. Names and functions of such components are also the same. Therefore, no redundant detailed description will be given of such components.

<System Configuration>

FIG. 1 is a view illustrating an outline of a system 1000. With reference to FIG. 1, system 1000 is a system that predicts abnormality generation of a maintenance target (hereinafter, also simply referred to as an "object") such as a pump by analyzing a signal of vibration generated during operation of the object. In the following description, it is assumed that the object is the pump, but the present disclosure is not limited thereto, and system 1000 can be applied to any object that generates the vibration (or sound) during the operation. For example, system 1000 can also be applied to abnormality prediction of a member vibrating in response to the vibration from a motor or a vibrating body.

System 1000 includes a vibration analysis system 100, a plurality of sensors 30, a terminal device 40, a network 50, and a plurality of pumps 70. Vibration analysis system 100 executes vibration analysis of pump 70. Vibration analysis system 100 includes an analysis device 10 and a sensor unit 20. Sensor unit 20 is electrically connected to the plurality of sensors 30. In system 1000, two sensor units 20 are connected to the analysis device 10, and at least three sensor units 20 or one sensor unit 20 may be connected to the analysis device 10. Each sensor unit 20 may be electrically connected to one sensor 30. Each sensor unit 20 may be electrically connected to the plurality of sensors 30 attached to the plurality of pumps 70.

Sensor 30 is attached to pump 70, and acquires a detection signal (vibration signal) detected due to vibration and sound of the pump. Analysis device 10 executes the vibration analysis of pump 70 based on the vibration signal input from sensor 30 through sensor unit 20. Analysis device 10 is configured to be able to communicate with terminal device 40 through network 50. Analysis device 10 transmits a vibration analysis result and the like to terminal device 40.

Analysis device 10 typically has a structure based on a general-purpose computer architecture, and causes a processor to execute a program installed in advance to perform various processing to be described later. For example, analysis device 10 is a desktop personal computer (PC). However, analysis device 10 only needs to be a device capable of performing a function and processing described below, and may be a different device (for example, a desktop PC or a tablet terminal device).

Network 50 includes various networks such as the Internet. Network 50 may adopt a wired communication system or another wireless communication system such as a wireless local area network (LAN).

For example, terminal device 40 is a portable tablet terminal device. Terminal device 40 is not limited thereto, but may be implemented by a smartphone, a desktop personal computer (PC), or the like. Vibration analysis system 100 of the embodiment is configured by a separate device in which analysis device 10 and sensor unit 20 are separated, and may be configured by an integrated device of analysis device 10 and sensor unit 20.

Figure 2:
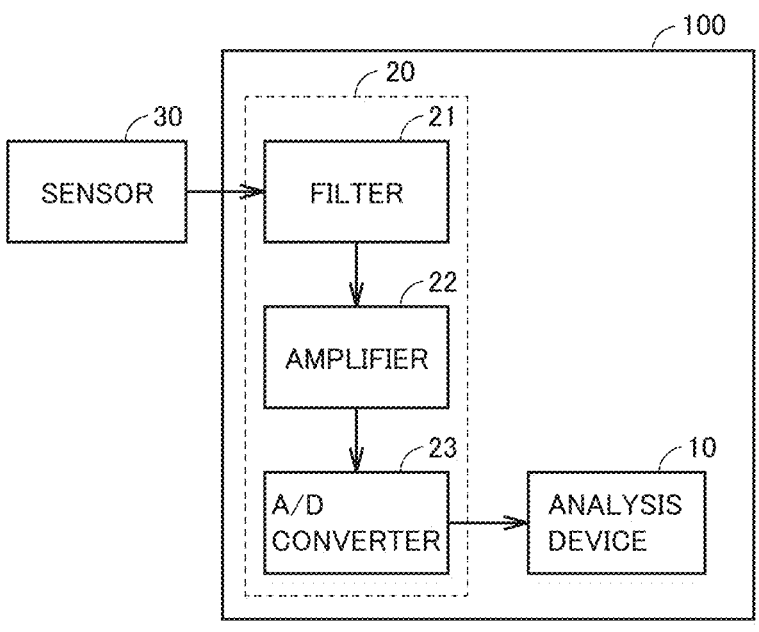
FIG. 2 is a block diagram illustrating an example of an overall configuration of a vibration analysis system.

FIG. 2 is a block diagram illustrating an example of an overall configuration of vibration analysis system 100. With reference to FIG. 2, vibration analysis system 100 includes analysis device 10 and sensor unit 20.

Sensor 30 connected to sensor unit 20 is a sensor capable of detecting the vibration or sound signal, and for example, is configured by an acceleration sensor using an organic piezoelectric element. Sensor 30 only needs to be a sensor capable of detecting the vibration or sound signal, and may be configured by an acceleration sensor of another type (for example, a servo type) or configured by various other sensors.

When the signal obtained by sensor 30 is a charge signal, a charge converter is provided between sensor 30 and vibration analysis system 100. In this case, the charge converter converts the charge signal from sensor 30 into a voltage signal, and outputs the voltage signal to vibration analysis system 100. When sensor 30 has a function of converting the charge signal into the voltage signal, the charge converter is unnecessary.

Sensor unit 20 converts the vibration signal acquired from sensor 30 (or the charge converter) into the signal that can be processed by analysis device 10. Specifically, sensor unit 20 includes a filter 21, an amplifier 22, and an A/D converter 23.

Filter 21 is an analog filter, and removes a noise component from the vibration signal output from sensor 30. Filter 21 is configured of a low-pass filter, a high-pass filter, or the like.

Amplifier 22 amplifies the analog signal output from filter 21 by a predetermined factor, and outputs the amplified signal to A/D converter 23.

A/D converter 23 converts the signal input from amplifier 22 from an analog signal to a digital signal at a predetermined sampling frequency. A/D converter 23 outputs the digitally converted signal to analysis device 10.

Figure 3:
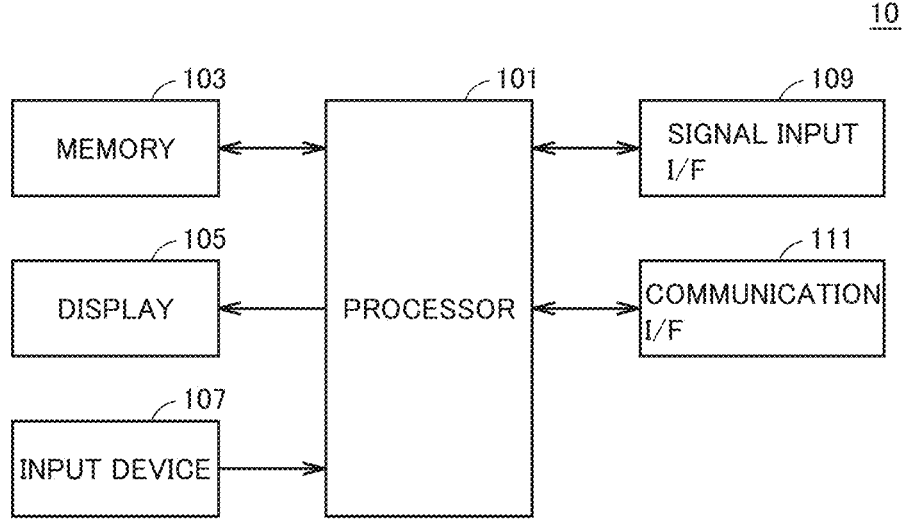
FIG. 3 is a block diagram illustrating an example of a hardware configuration of an analysis device.

FIG. 3 is a block diagram illustrating an example of a hardware configuration of analysis device 10. With reference to FIG. 3, analysis device 10 includes a processor 101, a memory 103, a display 105, an input device 107, a signal input interface (I/F) 109, and a communication interface (I/F) 111. Such units are data-communicatively interconnected.

Processor 101 is typically an arithmetic processing unit such as a central processing unit (CPU) or a multi processing unit (MPU). Processor 101 reads and executes the program stored in memory 103 to control the operation of each unit of analysis device 10. More specifically, processor 101 executes the program to perform each function of analysis device 10.

Memory 103 is implemented by a random access memory (RAM), a read-only memory (ROM), a flash memory, a hard disk, or the like. Memory 103 stores the program and the like executed by processor 101.

Display 105 is, for example, a liquid crystal display, an organic electroluminescence (EL) display, or the like. Display 105 may be inseparable from analysis device 10 or may be provided separately from analysis device 10.

Input device 107 receives an operation input directed to analysis device 10. Input device 107 is implemented by, for example, a keyboard, a button, a mouse, or the like. Further, input device 107 may be implemented as a touchscreen.

Signal input interface 109 mediates data transmission between processor 101 and sensor unit 20. Signal input interface (I/F) 109 receives the input of the vibration signal from sensor 30 through sensor unit 20. Specifically, signal input interface 109 receives the input of the digital signal from A/D converter 23.

Communication interface 111 mediates the data transmission between processor 101 and terminal device 40 or the like. As the communication system, for example, a radio communications system such as Bluetooth (registered trademark) or a wireless local area network (LAN) is used. Note that as the communication system, a wired communication system such as universal serial bus (USB) may be used.

<Abnormality Prediction System>

An outline of an abnormality prediction system of the embodiment will be described. The abnormality prediction system includes a preparation process of preparing reference data and an analysis process of analyzing an abnormal state of pump 70.

(Preparation Process)

In the preparation process of the embodiment, for example, the vibration state of pump 70 at the beginning of the operation is measured. Because pump 70 at the beginning of the operation is in a new state, the vibration state of pump 70 at the normal time is measured as a reference. However, instead of pump 70, a pump in the same type as pump 70 in the normal state may be separately prepared, and the vibration state of the pump may be measured as a reference.

Figure 4:
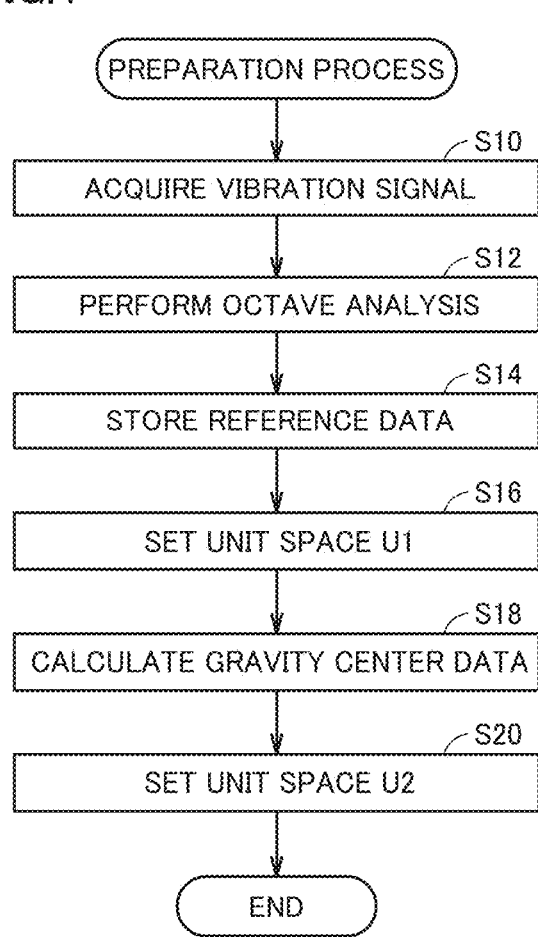
FIG. 4 is a flowchart illustrating an example of a preparation process.

FIG. 4 is a flowchart illustrating an example of the preparation process. Typically, the following steps are implemented by processor 101 of analysis device 10 executing the program stored in memory 103.

With reference to FIG. 4, processor 101 acquires the vibration signal output from sensor 30 through sensor unit 20 (step S10). Specifically, processor 101 acquires the vibration signal (the vibration signal indicating the vibration state of pump 70) corresponding to pump 70 at the normal time from sensor 30.

Processor 101 performs octave analysis on the vibration signal accumulated for a predetermined time (for example, several tens to several hundreds of milliseconds) (step S12). In the embodiment, ⅓ octave analysis is used. For this reason, for example, each vibration signal is separated into 48 bands from 0.4 Hz to 20 kHz by a ⅓ band pass filter, and a signal intensity (vibration intensity) is averaged for each band (that is, the frequency band). In the following description, the signal intensity averaged in the frequency band is also simply referred to as "the signal intensity in the frequency band".

For each frequency band, processor 101 stores the signal intensity of the frequency band corresponding to pump 70 at the normal time in memory 103 as reference data R (step S14).

FIG. 5 is a view illustrating an example of a data set of the signal intensity in each frequency band. With reference to FIG. 5, data set 310 includes a signal intensity L of each frequency band f1 to fn (where n is a natural number, n<m) for each time T1 to Tm (where m is a natural number). When each vibration signal is separated into 48 bands, n=48. For example, data set 310 includes signal intensities $L1\_1$ to $L1\_n$ of respective frequency bands f1 to fn at the time T1, and includes signal intensities $Lm\_1$ to $Lm\_n$ of respective frequency bands f1 to fn at the time Tm. For example, reference data R includes the signal intensity L of each of frequency bands f1 to fn of each of times T1 to Tn. In this case, the period from time T1 to time Tn corresponds to the operation start initial period.

Referring back to FIG. 4, processor 101 sets a unit space U1 in a Mahalanobis-Taguchi method (MT method) using reference data R (step S16). Specifically, processor 101 sets the data of signal intensity L of each of frequency bands f1 to fn at each of times T1 to Tn as unit space U1. Unit space U1 is used in a first abnormality prediction process described later.

Processor 101 calculates two-dimensional gravity center data indicating the gravity center position of the signal intensity of each frequency band (step S18). Specifically, processor 101 generates the data set in FIG. 6 from data set 310.

FIG. 6 is a view illustrating an example of the data set of the gravity center position. With reference to FIG. 6, a data set 320 includes a gravity center position Gx of the frequency band and a gravity center position Gy of the signal intensity for times T1 to Tm. The two-dimensional gravity center data (gravity center position Gx, Gy) is generated for each of times T1 to Tm. Gravity center position Gx is expressed by the following equation (1), and gravity center position Gy is expressed by the following equation (2).

[Mathematical Formula 1]

$$G_x = \sum_{i=1}^{n} f_i L_i / S \tag{1}$$

[Mathematical formula 2]

$$G_y = \sum_{i=1}^{n} \frac{1}{2} L_i^2 / S \tag{2}$$

$f_i$ represents the i-th frequency band, $L_i$ represents the signal intensity of the i-th frequency band, and S represents a sum of the signal intensities of all the frequency bands. According to the above (1) and (2), data set 320 including the two-dimensional data (gravity center positions Gx, Gy) is generated from data set 310 including the n-dimensional (multidimensional) data (signal intensity L of each of frequency bands f1 to fn). In data set 320, for example, gravity center positions Gx, Gy at time T1 are represented by gravity center positions Gf_1, GL_1, respectively, and the gravity center positions Gx, Gy at time Tm are represented by gravity center positions Gf_m, GL_m, respectively.

With reference to FIG. 4, processor 101 sets a unit space U2 in the MT method using the gravity center data in the operation start initial period (for example, times T1 to Tn) (step S20). Specifically, processor 101 sets the two-dimensional gravity center data (gravity center positions Gx, Gy) at each of times T1 to Tn as unit space U2. Unit space U2 is used in a second abnormality prediction process described later.

(Analysis Process)

The analysis process includes first and second abnormality prediction processes of predicting an abnormality generation period of the vibration state of pump 70, and a trend analysis process of analyzing a future tendency of the vibration state of pump 70.

FIG. 7 is a flowchart illustrating an example of the analysis process. With reference to FIG. 7, processor 101 acquires the vibration signal output from sensor 30 through sensor unit 20 (step S30). Specifically, processor 101 acquires the vibration signal corresponding to pump 70 during the normal period (for example, a period after the end of the operation start initial period) from sensor 30.

Processor 101 performs octave analysis on the vibration signal accumulated for a predetermined time (step S32). For each frequency band, processor 101 stores the signal intensity of the frequency band corresponding to pump 70 in memory 103 (step S34). Specifically, the signal intensity of each frequency band in pump 70 at a certain time Ts is stored in the form of data set 310. Here, a series of signal strengths Ls_1 to Ls_n in frequency bands f1 to fn in pump 70 at time Ts is also referred to as signal strength data Ps. Since the period from time T1 to time Tn corresponds to the operation start initial period, the normal period corresponds to the period from time Tn+1 to time Tm. Consequently, time Ts is one of time Tn+1 to time Tm.

Using signal strength data Ps and the data obtained in the preparation process, processor 101 executes the first abnormality prediction process (step S40), the second abnormality prediction process (step S60), and the trend analysis process (step S70). These processes may be executed in parallel or sequentially.

[First Abnormality Prediction Process]

Figure 8:
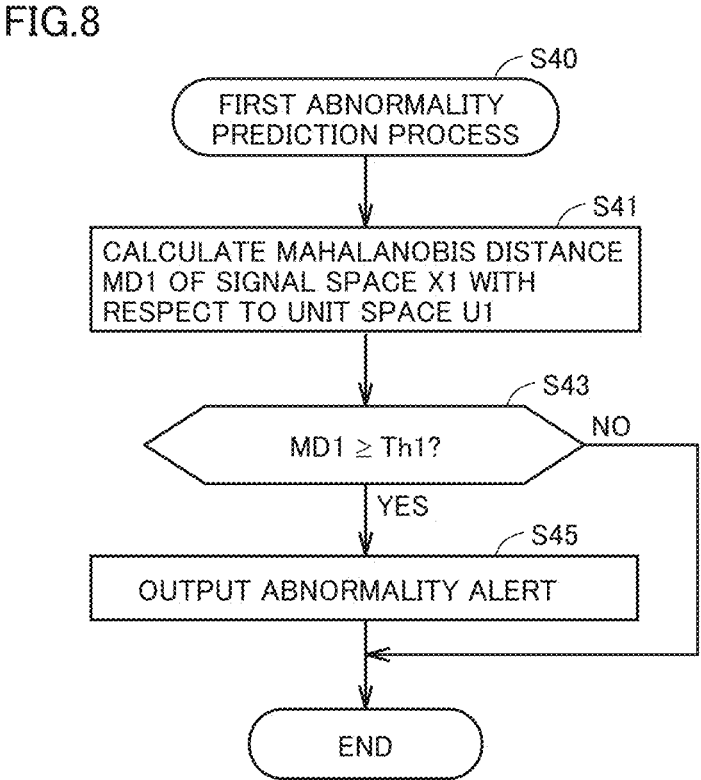
FIG. 8 is a flowchart illustrating an example of a first abnormality prediction process.

FIG. 8 is a flowchart illustrating an example of the first abnormality prediction process. Data set 310 configured of multidimensional data is used in the first abnormality prediction process. With reference to FIG. 8, processor 101 calculates a Mahalanobis distance MD1 (hereinafter, also simply referred to as a "distance MD1") of a signal space X1s configured of a plurality of signal intensities with respect to unit space U1 set in step S16 of FIG. 4 (step S41). Signal space X1s includes a plurality of signal strengths Ls_1 to Ls_n (that is, signal strength data Ps) at time Ts.

Processor 101 determines whether distance MD1 is greater than or equal to a threshold Th1 (for example, 5) (step S43). When distance MD1 is less than threshold Th1 (NO in step S43), processor 101 ends the first abnormality prediction process. When distance MD1 is greater than or equal to threshold Th1 (YES in step S43), processor 101 predicts that the abnormality will be generated in pump 70 in the near future, outputs an abnormality alert (step S45), and ends the first abnormality prediction process. Typically, the anomaly alert is displayed on display 105. The abnormality alert may be configured to be output by voice through a speaker.

Figure 9:
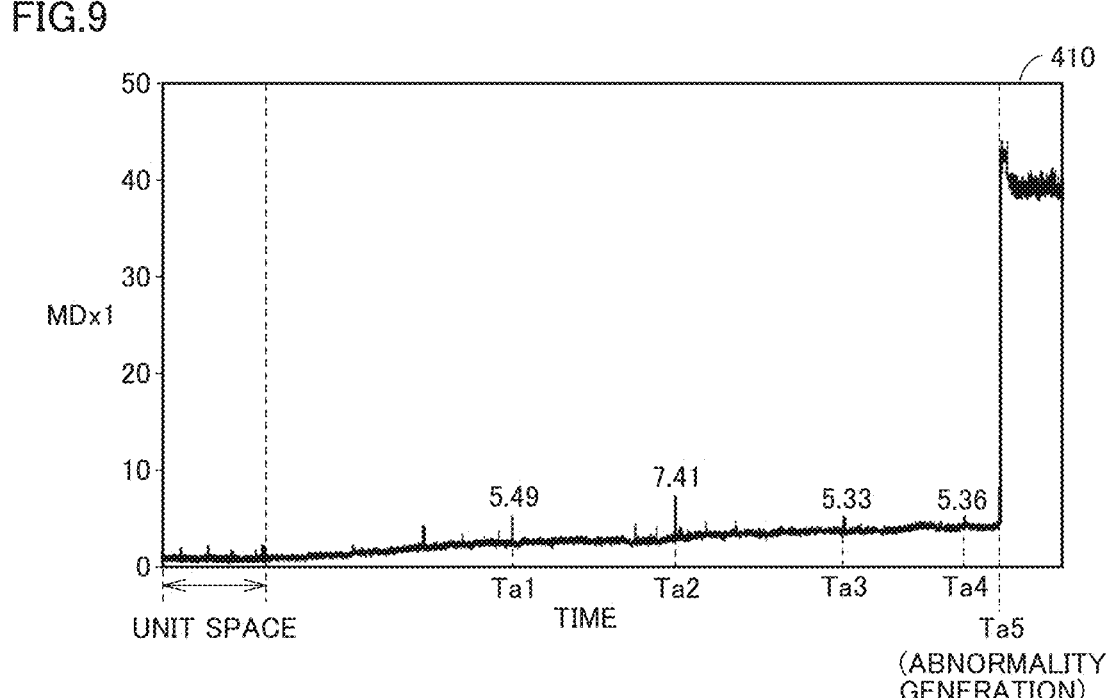
FIG. 9 is a view illustrating time-series data of a Mahalanobis distance based on multidimensional data.

With reference to FIG. 9, the reason why processor 101 makes the above prediction will be described. FIG. 9 is a view illustrating time-series data of the Mahalanobis distance based on the multidimensional data. A graph 410 illustrates the time-series data of a Mahalanobis distance MDx1 in the same type of reference pump as pump 70. Consequently, it can be said that Mahalanobis distance MDx1 of graph 410 indicates the same tendency as Mahalanobis distance MD1 in pump 70.

According to graph 410, Mahalanobis distance MDx1 of the signal space with respect to the unit space exceeds threshold Th1 (=5) for the first time at a time Ta1. Thereafter, at times Ta2, Ta3, Ta4, Mahalanobis distance MDx1 exceeds threshold Th1, and finally, the abnormality is generated in the reference pump at a time Ta5. The period from time Ta1 to time Ta5 was 4.5 days, the period from time Ta2 to time Ta5 was 3 days, the period from time Ta3 to time Ta5 was 1.5 days, and the period from time Ta4 to time Ta5 was 8.5 hours. From this, it is understood that the abnormality is generated several days after Mahalanobis distance MDx1 exceeds threshold Th1 for the first time.

Accordingly, when Mahalanobis distance MD1 greater than or equal to threshold Th1 is calculated, processor 101 predicts that the abnormality will be generated in pump 70 in the near future. In particular, processor 101 may predict that the abnormality is generated in pump 70 several days after Mahalanobis distance MD1 greater than or equal to threshold Th1 is calculated for the first time. In this case, processor 101 may output the anomaly alert with a relatively high warning level that notifies that the anomaly may be generated in pump 70 in a few days.

[Second Abnormality Prediction Process]

Figure 10:
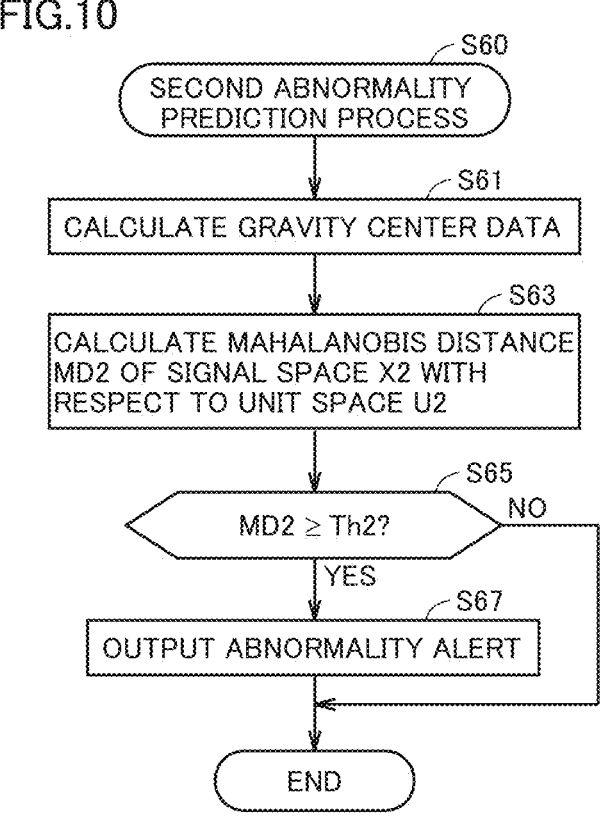
FIG. 10 is a flowchart illustrating an example of a second abnormality prediction process.

FIG. 10 is a flowchart illustrating an example of the second abnormality prediction process. With reference to FIG. 10, processor 101 calculates the two-dimensional gravity center data indicating the gravity center position of the signal intensity of each frequency band (step S61). Specifically, processor 101 calculates the two-dimensional gravity center data (that is, gravity center positions Gx, Gy) from signal strength data Ps stored in step S34 using the equations (1) and (2).

Processor 101 calculates a Mahalanobis distance MD2 (hereinafter, also simply referred to as a "distance MD2") of a signal space X2s configured of the two-dimensional gravity center data with respect to unit space U2 set in step S20 of FIG. 4 (step S63). Signal space X2 includes gravity center positions Gx, Gy (that is, Gf_s, GL_s) at time Ts.

Processor 101 determines whether distance MD2 is greater than or equal to a threshold Th2 (for example, 5) (step S65). When distance MD2 is less than threshold Th2 (NO in step S65), processor 101 ends the second abnormality prediction process. When distance MD2 is greater than or equal to threshold Th2 (YES in step S65), processor 101 predicts that the abnormality will be generated in pump 70 in the very near future, outputs the abnormality alert (step S67), and ends the second abnormality prediction process.

Figure 11:
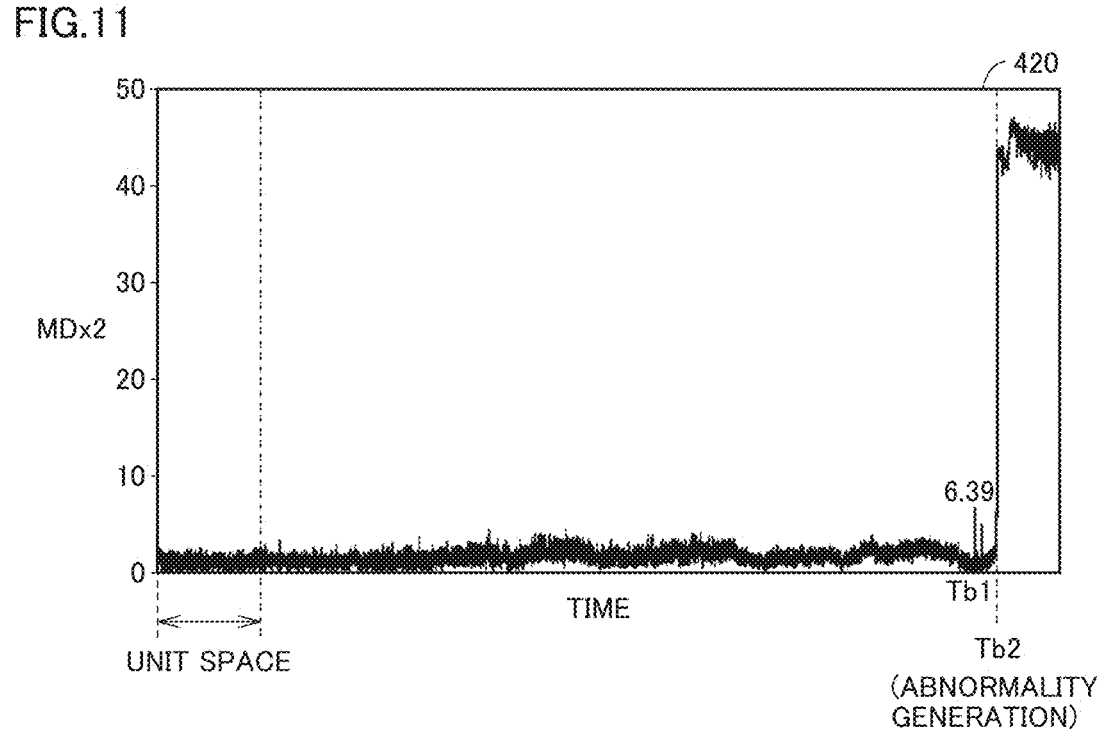
FIG. 11 is a view illustrating the time-series data of the Mahalanobis distance based on two-dimensional data.

With reference to FIG. 11, the reason why processor 101 makes the above prediction will be described. FIG. 11 is a view illustrating the time-series data of the Mahalanobis distance based on the two-dimensional data. A graph 420 illustrates the time-series data of Mahalanobis distance MDx2 in the same type of reference pump as pump 70. Consequently, it can be said that Mahalanobis distance MDx2 of graph 420 indicates the same tendency as Mahalanobis distance MD2 in pump 70.

According to graph 420, Mahalanobis distance MDx2 exceeds threshold Th2 (=5) for the first time at a time Tb1. Thereafter, the abnormality is generated in the reference pump at a time Tb2. The period from time Tb1 to time Tb2 was 5.5 hours. From this, it can be said that the abnormality is generated several hours after Mahalanobis distance MDx2 first exceeds threshold Th2.

Accordingly, when Mahalanobis distance MD2 greater than or equal to threshold Th2 is calculated, processor 101 predicts that the abnormality will be generated in pump 70 in the very near future. In particular, processor 101 may predict that the abnormality is generated in pump 70 several hours after Mahalanobis distance MD2 greater than or equal to threshold Th2 is calculated for the first time. In this case, processor 101 may output the abnormality alert with a high warning level that notifies that the abnormality may be generated after several hours.

[Trend Analysis Process]

Figure 12:
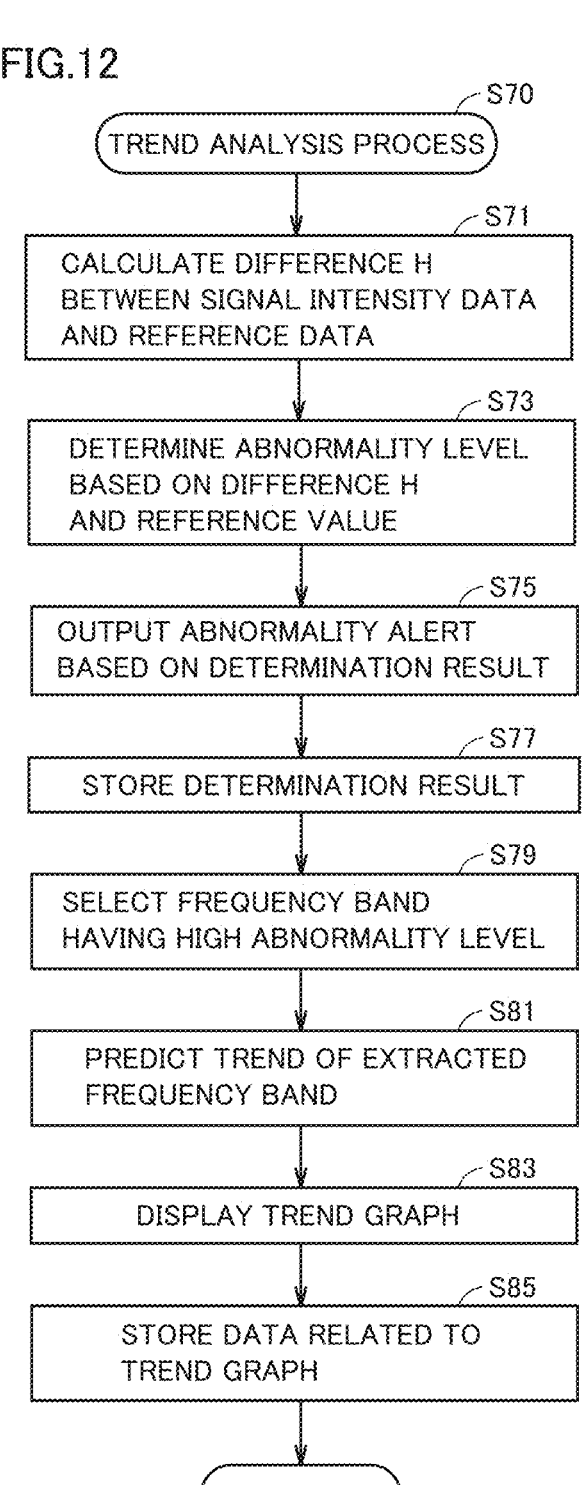
FIG. 12 is a flowchart illustrating an example of a trend analysis process.

FIG. 12 is a flowchart illustrating an example of the trend analysis process. With reference to FIG. 12, processor 101 calculates a difference H obtained by subtracting the representative data of reference data R from signal strength data Ps (step S71).

Reference data R includes a data group including signal intensity L of frequency bands f1 to fn of times T1 to Tn. For example, processor 101 extracts signal strengths Ln_1 to Ln_n of respective frequency bands f1 to fn at certain time Tn as representative data in the data group. Then, processor 101 calculates difference H obtained by subtracting the representative data from signal strength data Ps. Thus, difference H between the respective frequency bands is calculated.

The representative data may be configured by an average value of signal intensities L of frequency bands f1 to fn of times T1 to Tn. In this case, for example, signal intensity L1 of frequency band f1 included in the representative data is configured of the average value of signal intensities L1_1 to Ln_1, and signal intensity Ln of frequency band fn included in the representative data is configured of the average value of the signal intensities L1_$n$ to Ln_n.

Subsequently, processor 101 determines the abnormality level of the vibration state of pump 70 in each frequency band by comparing difference H with a plurality of reference values Z1, Z2, Z3 for each frequency band (step S73). For example, when difference H is greater than or equal to 0 and less than reference value Z1 (for example, 3 dB), abnormality level is "0", and the vibration state is "normal". When difference H is greater than or equal to reference value Z1 and less than reference value Z2 (for example, 6 dB), the abnormality level is "1", and it is recommended that the state of pump 70 is checked. When difference H is greater than or equal to reference value Z2 and less than reference value Z3 (for example, 10 dB), the abnormality level is "2", and the maintenance of pump 70 is recommended. When difference H is greater than or equal to reference value Z3, the abnormality level is "3" that is a dangerous state in which pump 70 needs to be replaced or the like.

Processor 101 outputs the abnormality alert based on the determination result of the abnormality level of the vibration state in pump 70 (step S75). Specifically, processor 101 outputs the abnormality alert (for example, "danger") with a high warning level when the abnormality level is "3" (that is, when H≥Z3), outputs the abnormality alert (for example, "Maintenance recommendation") with a relatively high warning level when the abnormality level is "2" (that is, when Z2≤H<Z3), and outputs the abnormality alert (for example, "caution") with a low warning level when the abnormality level is "1" (that is, when Z1≤H<Z2). When the abnormality level is "0" (that is, when H<Z1), processor 101 may output that the vibration state of pump 70 is "normal". Subsequently, processor 101 stores the determination result of the abnormality level (step S77).

Processor 101 specifies a predetermined number (for example, five) of vibration states having the high abnormality level at the reference time point (for example, the current time point) among the vibration states of pump 70 in each frequency band, and extracts the frequency band corresponding to the specified vibration state (step S79). The reference time point is configured to be arbitrarily selectable by the user.

Processor 101 executes trend prediction processing for the vibration state of the extracted frequency band (hereinafter, also referred to as an "extraction frequency band") (step S81). Specifically, processor 101 predicts the tendency of future difference H based on the time-series data of existing (past) difference H in the extraction frequency band. For example, processor 101 approximates the time-series data of difference H in the past before the reference time point with an approximate curve (for example, linear approximation or exponential approximation), and predicts difference H in the future after the reference time point. Furthermore, processor 101 may acquire a regression line by performing regression analysis on the time-series data of past difference H, and predict future difference H based on a slope and an intercept of the regression line.

Processor 101 displays the result of the trend prediction processing on display 105 as a trend graph (step S83). Processor 101 stores the data related to the trend graph in memory 103 (step S85), and ends the trend analysis process. For example, processor 101 stores various data such as the extraction frequency band and the trend graph in memory 103.

<Screen Example>

Figure 13:
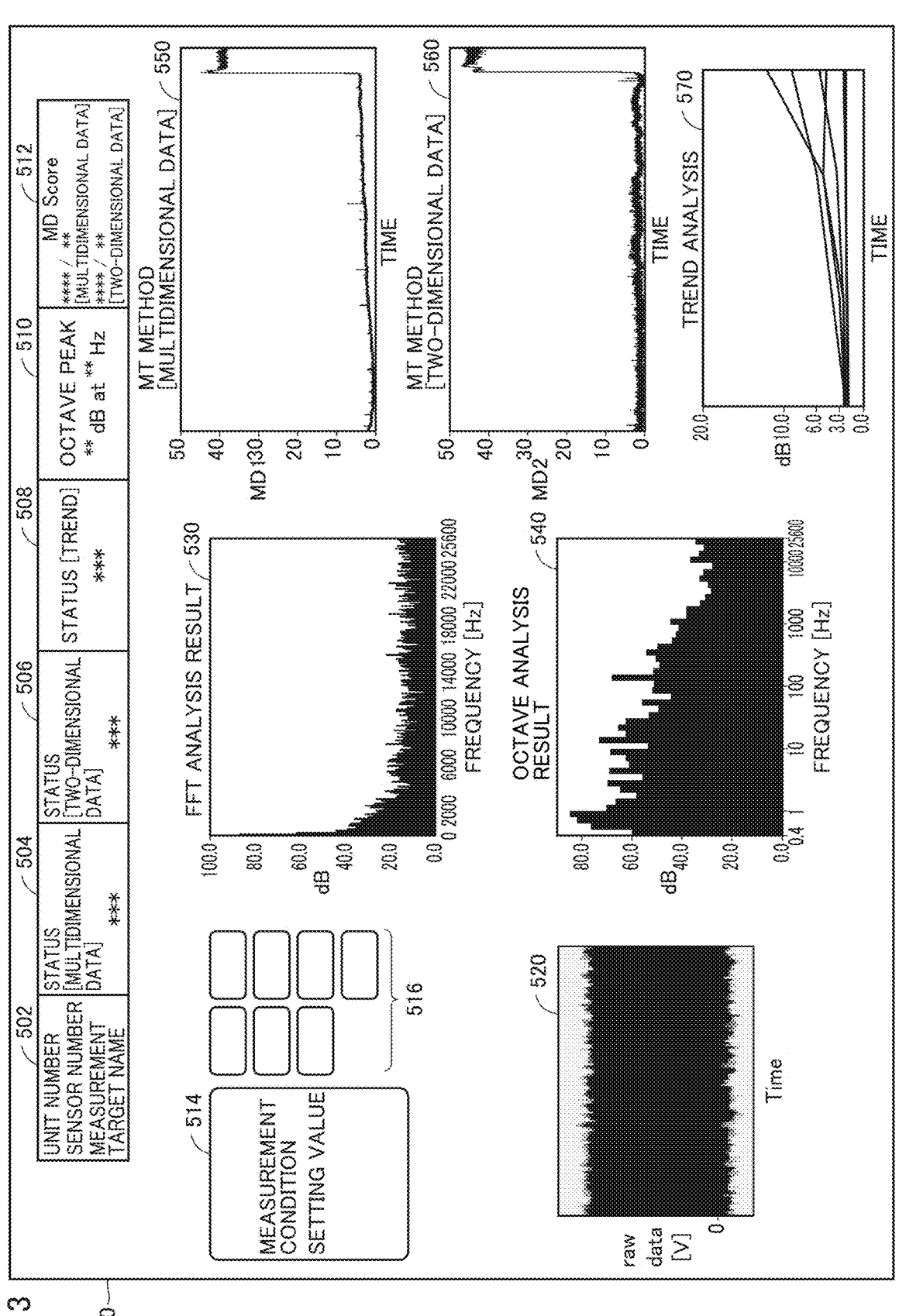
FIG. 13 is a view illustrating a layout example of a user interface screen.

FIG. 13 is a view illustrating a layout example of a user interface screen 500. However, user interface screen 500 only needs to be a layout that can implement a function described later, and may be a layout other than the layout in FIG. 13.

With reference to FIG. 13, user interface screen 500 includes display areas 502 to 512, a display area 514 for a measurement condition and a setting value, various buttons 516, display areas 520 to 540, and graphs 550 to 570.

An identification number (unit number) of sensor unit 20, an identification number (sensor number) of sensor 30, a measurement target name (for example, the pump), and the like are displayed in display area 502. A status based on distance MD1 calculated by the MT method using the multidimensional data is displayed in display region 504. This status changes according to the calculated value of distance MD1. For example, the status "danger" is displayed when distance MD1 greater than or equal to threshold Th1 (for example, 5) is calculated, the status "maintenance recommendation" is displayed when distance MD1 less than threshold Th1 and greater than or equal to a threshold Th1$a$ (for example, 4) is calculated, the status "caution" is displayed when distance MD1 less than threshold Th1$a$ and greater than or equal to a threshold Th1$b$ (for example, 3) is calculated, and the status "normal" is displayed when distance MD1 less than threshold Th1$b$ is calculated. As described above, the larger distance MD1, the higher the warning level of the status.

A status based on distance MD2 calculated by the MT method using the two-dimensional data is displayed in display area 506. This status changes according to the value of distance MD2. For example, the status "danger" is displayed when distance MD2 equal to or greater than or equal to threshold Th2 (for example, 5) is calculated, the status "maintenance recommendation" is displayed when distance MD2 less than threshold Th2 and greater than or equal to a threshold Th2$a$ (for example, 4) is calculated, the status "caution" is displayed when distance MD2 less than threshold Th2$a$ and greater than or equal to a threshold Th2$b$ (for example, 3) is calculated, and the status "normal" is displayed when distance MD2 less than threshold Th2$b$ is calculated. As described above, the larger distance MD2, the higher the warning level of the status.

A status based on the trend analysis is displayed in display area 508. This status changes according to difference H at the reference time point. For example, the status "danger" is displayed when difference H at the reference time point is greater than or equal to reference value Z3 (for example, 10 dB), the status "maintenance recommendation" is displayed when difference H is less than reference value Z3 and greater than or equal to reference value Z2 (for example, 6 dB), the status "caution" is displayed when difference H is less than reference value Z2 and greater than or equal to reference value Z1 (for example, 3 dB), and the status "normal" is displayed when difference H is less than reference value Z1. As described above, the larger difference H, the higher the warning level of the status.

Display area 520 illustrates time-series sensor data (raw data) detected by sensor 30. An analysis result (frequency spectrum) obtained by fast Fourier transform (FFT) analysis of time-series sensor data is displayed in display area 530. In display area 540, signal strength data obtained by ⅓ octave analysis of the time-series sensor data is displayed as a bar graph.

A graph 550 illustrates the time-series data of distance MD1. A graph 560 illustrates the time-series data of distance MD2. A graph 570 is the trend graph obtained by the processing in step S83 of FIG. 12.

As described above, it is predicted that the abnormality is generated in pump 70 several days after distance MD1 greater than or equal to threshold Th1 is first calculated, and it is predicted that the abnormality is generated in pump 70 several hours after distance MD2 greater than or equal to threshold Th2 is first calculated. Consequently, the user can estimate the abnormality generation period of pump 70 by checking graphs 550 and 560.

For example, the user advances the maintenance preparation while checking the state change when distance MD1 greater than or equal to threshold Th1 is checked in graph 550, and the user can immediately start the maintenance when distance MD2 greater than or equal to threshold Th2 is checked in graph 560. Thus, the period of device maintenance such as inspection, maintenance, and repair of pump 70 can be accurately predicted, so that the device maintenance can be implemented in a planned manner.

<Functional Configuration>

Figure 14:
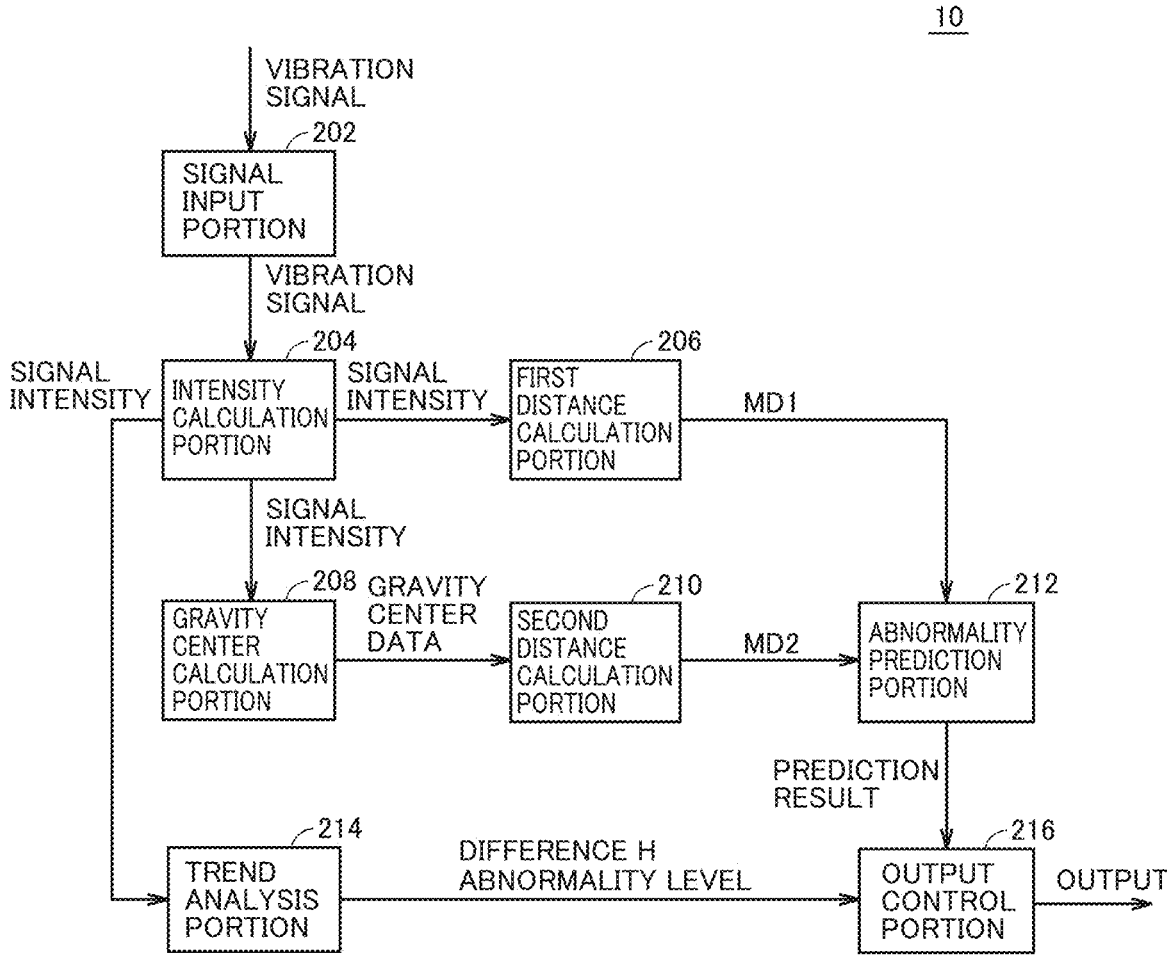
FIG. 14 is a functional block diagram of the analysis device.

FIG. 14 is a functional block diagram of analysis device 10. With reference to FIG. 14, analysis device 10 includes a signal input portion 202, an intensity calculation portion 204, a first distance calculation portion 206, a gravity center calculation portion 208, a second distance calculation portion 210, an abnormality prediction portion 212, a trend analysis portion 214, and an output control portion 216 as a main functional configuration. The functions of such components are each implemented, for example, via the program executed by processor 101 of analysis device 10, the program being stored in memory 103. Note that some or all of the functions may be implemented via hardware.

Signal input portion 202 receives the input of the vibration signal detected by sensor 30 attached to operating pump 70. Specifically, signal input portion 202 receives the vibration signal (digital signal) detected by sensor 30 through sensor unit 20.

Intensity calculation portion 204 analyzes the vibration signal received by signal input portion 202 to calculate a plurality of signal intensities corresponding to the plurality of frequency bands. Specifically, intensity calculation portion 204 calculates the signal intensity (for example, signal intensity L of each of frequency bands f1 to fm) of each frequency band by performing the octave analysis (for example, ⅓ octave analysis) on the vibration signal corresponding to pump 70. Intensity calculation portion 204 may be configured to calculate the signal intensity of each frequency band by fast Fourier transform (FFT).

First distance calculation portion 206 calculates the Mahalanobis distance (for example, distance MD1) of the signal space (for example, signal space X1) configured by the plurality of signal intensities with respect to the previously-set unit space (for example, unit space U1) using the MT method. Typically, unit space U1 includes the plurality of signal intensities L corresponding to the plurality of frequency bands f1 to fn that are calculated by analyzing the vibration signal corresponding to pump 70 during the normal time. The vibration signal corresponding to pump 70 in the normal time may be, for example, the vibration signal indicating the vibration state of pump 70 at each of times T1 to Tn (that is, the operation start initial period), or the vibration signal indicating the vibration state of the pump in the normal state of the same type as pump 70. When distance MD1 for each time (for example, time Tn+1 to Tm) is calculated, the time-series data of distance MD1 is generated.

Gravity center calculation portion 208 calculates the two-dimensional gravity center data (for example, gravity center positions Gx, Gy) indicating the gravity center positions of the plurality of signal intensities calculated by intensity calculation portion 204.

Second distance calculation portion 210 calculates the Mahalanobis distance (for example, distance MD2) of the signal space (for example, signal space X2) configured by two-dimensional gravity center data with respect to the previously-set unit space (for example, unit space U2) using the MT method. Typically, unit space U2 is constituted by two-dimensional gravity center data indicating the gravity center positions of the plurality of signal intensities L constituting unit space U1. The time series data of distance MD2 is generated by calculating distance MD2 for each time (for example, time Tn+1 to Tm).

Abnormality prediction portion 212 predicts the abnormality generation period at which the abnormality is generated in pump 70 based on distance MD1 and distance MD2. In one aspect, the abnormality generation period when distance MD1 greater than or equal to threshold Th1 is calculated is predicted to be in the near future than the abnormality generation period when distance MD1 greater than or equal to threshold Th1 is not calculated. Specifically, abnormality prediction portion 212 predicts that the abnormality is generated in pump 70 several days after distance MD1 greater than or equal to threshold Th1 is calculated. When distance MD1 greater than or equal to threshold Th1 is not calculated at the present time, abnormality prediction portion 212 may predict that the low possibility that the abnormality is generated in pump 70 within several days from the present time.

In another aspect, the abnormality generation period when distance MD1 greater than or equal to threshold Th1 is calculated and when distance MD2 greater than or equal to threshold Th2 is calculated is predicted to be in the near future than the abnormality generation period when distance MD1 greater than or equal to threshold Th1 is calculated and when distance MD2 greater than or equal to threshold Th2 is not calculated. Specifically, abnormality prediction portion 212 predicts that the abnormality is generated in pump 70 several hours after distance MD2 greater than or equal to threshold Th2 is calculated. When distance MD1 greater than or equal to threshold Th1 is calculated at the present time but when distance MD2 greater than or equal to threshold Th2 is not calculated, abnormality prediction portion 212 may predict that the low possibility that the abnormality is generated in pump 70 within several hours from the present time.

For each of the plurality of frequency bands, trend analysis portion 214 calculates difference H between the signal intensity of the frequency band corresponding to pump 70 and the signal intensity of the frequency band corresponding to the reference pump. Based on the signal intensity of each frequency band corresponding to pump 70 and the predetermined reference value, trend analysis portion 214 determines the abnormality level of the vibration state of pump 70 in each frequency band. Specifically, for each of the plurality of frequency bands, trend analysis portion 214 determines the abnormality level of the vibration state of pump 70 in the frequency band by comparing difference H in the frequency band with the plurality of reference values Z1 to Z3.

In addition, trend analysis portion 214 specifies a predetermined number (for example, five) of vibration states in descending order of the abnormality level from among the vibration states of pump 70 in each frequency band, and extracts the frequency band corresponding to the specified vibration state. Trend analysis portion 214 predicts future difference H of each frequency band based on the time-series data of difference H of each frequency band stored in memory 103. Specifically, trend analysis portion 214 predicts future difference H by performing the regression analysis on the time-series data of difference H before the reference time point. Alternatively, trend analysis portion 214 predicts future difference H by approximating the time-series data of past difference H with the approximate curve.

Output control portion 216 outputs various types of information such as a prediction result of abnormality prediction portion 212. In one aspect, output control portion 216 outputs first warning information (for example, information warning the abnormality generation of pump 70 in the near future) when distance MD1 greater than or equal to threshold Th1 is calculated, and outputs second warning information (for example, information warning the abnormality generation of pump 70 in the very near future) having a larger warning level (encouraging strongly the warning to the user) than the first warning information when distance MD2 greater than or equal to threshold Th2 is calculated.

For example, when the first warning information is the warning level indicating a medium degree of urgency, the second warning information is the warning level indicating a high degree of urgency. That is, the second warning information is information having the higher degree of urgency than the first warning information. In this case, output control portion 216 may display the display mode of the second warning information on display 105 in a more emphasized manner (that is, the second warning information is made more conspicuous than the first warning information) than the display mode of the first warning information.

In another aspect, output control portion 216 causes display 105 to display various types of information illustrated in user interface screen 500. Specifically, output control portion 216 causes display 105 to display the time-series data of distance MD1 (for example, graph 550 in FIG. 13) and the time-series data of distance MD2 (for example, graph 560 in FIG. 13). In still another aspect, output control portion 216 causes display 105 to display predicted future difference H (for example, the trend graph illustrated in graph 570) of each frequency band. In addition, output control portion 216 outputs the abnormality alert (for example, displays the abnormality alert on display 105) based on the determination result of the abnormality level determined by trend analysis portion 214.

Advantages

According to the embodiment, whether the abnormality generation period of pump 70 is in the near future (for example, after several days) or in the extremely near future (for example, after several hours) can be predicted by checking distance MD1 and distance MD2 by the MT method. Furthermore, with reference to the tendency by the trend graph, the abnormality of pump 70 can be previously predicted from various angles. Consequently, the device maintenance can be performed in a planned manner.

OTHER EMBODIMENT (1) In the above-described embodiment, the configuration in which analysis device 10 predicts that the abnormality is generated several days after Mahalanobis distance MD1 greater than or equal to threshold Th1 is calculated for the first time. In this regard, as illustrated in FIG. 9, Mahalanobis distance MDx1 becomes greater than or equal to threshold Th1 at times Ta2, Ta3, Ta4 after becoming greater than or equal to threshold Th1 for the first time at time Ta1, and the abnormality is generated in the reference pump at time Ta5. Accordingly, it can be said that the more the number of times Mahalanobis distance MDx1 becomes greater than or equal to threshold Th1, the closer the abnormality generation period is. Accordingly, analysis device 10 (abnormality prediction portion 212) may predict that the abnormality of pump 70 will be generated in the closer future as the number of times distance MD1 greater than or equal to threshold Th1 is calculated is larger.

(2) In the above-described embodiments, it is also possible to provide a program for enabling a computer to execute the control as described in the above-described flowchart. Such a program can also be provided as a program product by being recorded on a non-transitory computer-readable recording medium such as a flexible disk, a compact disc read only memory (CD-ROM), a secondary storage device, a primary storage device, or a memory card attached to the computer. Alternatively, the program can be provided by being recorded on a recording medium such as a hard disk built in the computer. Further, the program can be provided by being downloaded over a network.

The program may be a program that calls a necessary module in a predetermined sequence at a predetermined timing from among program modules provided as a part of an operating system (OS) of the computer to perform processing. In this case, the program itself does not include the modules, and the processing is performed in cooperation with the OS. A program having no such modules may also be included in the program according to the present embodiment. Further, the program according to the present embodiment may be provided by being incorporated into a part of the other program. In this case as well, the program itself does not include modules included in the other program, and the processing is performed in cooperation with the other program. A program incorporated into the other program may also be included in the program according to the present embodiment.

(3) Each of the configurations exemplified as the above-described embodiments is an example of the configuration of the present disclosure, and may be combined with another known technique, or may be modified, for example, partially omitted, without departing from the gist of the present disclosure. Further, in the above-described embodiments, the processing and configuration described in the other embodiment may be employed and implemented as needed.

It should be understood that the embodiments disclosed herein are illustrative in all respects and not restrictive. The scope of the present disclosure is defined by the claims rather than the above description, and the present disclosure is intended to include the claims, equivalents of the claims, and all modifications within the scope.

REFERENCE SIGNS LIST

10: analysis device, 20: sensor unit, 21: filter, 22: amplifier, 23: converter, 30: sensor, 40: terminal device, 50: network, 70: pump, 100: vibration analysis system, 101: processor, 103: memory, 105: display, 107: input device, 109: signal input interface, 111: communication interface, 202: signal input portion, 204: intensity calculation portion, 206: first distance calculation portion, 208: gravity center calculation portion, 210: second distance calculation portion, 212: abnormality prediction portion, 214: trend analysis portion, 216: output control unit, 310, 320: data set, 500: user interface screen, 1000: system

The invention claimed is:

1. A vibration analysis system comprising:
a sensor configured to be attached to an operating object, the sensor being one of an acceleration sensor using a piezoelectric unit or a servo type acceleration sensor;
a signal input portion that receives an input of a vibration signal detected by the sensor and that outputs a digital vibration signal corresponding to the object;
an intensity calculation portion that receives the digital vibration signal corresponding to the object from the signal input portion and calculates a plurality of signal intensities corresponding to a plurality of frequency bands by analyzing the digital vibration signal corresponding to the object;
a first distance calculation portion that calculates a first Mahalanobis distance of a first signal space configured of the plurality of signal intensities with respect to a previously-set first unit space;
a gravity center calculation portion that calculates two-dimensional gravity center data indicating gravity center positions of the plurality of signal intensities calculated by the intensity calculation portion;
a second distance calculation portion that calculates a second Mahalanobis distance of a second signal space configured of the two-dimensional gravity center data with respect to a previously-set second unit space; and
an abnormality prediction portion that predicts an abnormality generation period at which an abnormality is generated in the object based on the first Mahalanobis distance and the second Mahalanobis distance,
the system configured to cause maintenance preparation for the object to be advanced responsive to the first Mahalanobis distance exceeding a first threshold and to cause maintenance on the object to be initiated responsive to the second Mahalanobis distance exceeding a second threshold.

2. The vibration analysis system according to claim 1, wherein
the first unit space is configured of the plurality of signal intensities corresponding to the plurality of frequency bands, the plurality of signal intensities being calculated by analyzing the vibration signal corresponding to the object at a normal time, and
the second unit space is configured of the two-dimensional gravity center data indicating the gravity center positions of the plurality of signal intensities constituting the first unit space.

3. The vibration analysis system according to claim 1, wherein the abnormality generation period is predicted to occur earlier in time when the first Mahalanobis distance is calculated to be greater than or equal to the first threshold than when the first Mahalanobis distance is calculated to be not greater than or equal to the first threshold.

4. The vibration analysis system according to claim 3, wherein the abnormality prediction portion predicts that the abnormality is generated in the object several days after the first Mahalanobis distance is calculated to be greater than or equal to the first threshold.

5. The vibration analysis system according to claim 3, wherein the abnormality generation period is predicted to occur earlier in time when the first Mahalanobis distance is calculated to be greater than or equal to the first threshold and when the second Mahalanobis distance greater than or equal to the second threshold than when the first Mahalanobis distance is calculated to be greater than or equal to the first threshold and the second Mahalanobis distance is calculated to be not greater than or equal to the second threshold.

6. The vibration analysis system according to claim 5, wherein the abnormality prediction portion predicts that the abnormality is generated in the operating object several hours after the second Mahalanobis distance is calculated to be greater than or equal to the second threshold.

7. The vibration analysis system according to claim 5, further comprising an output control portion including a display that outputs first warning information when the first Mahalanobis distance is calculated to be greater than or equal to the first threshold, and outputs second warning information having a larger warning level than the first warning information when the second Mahalanobis distance is calculated to be greater than or equal to the second threshold.

8. The vibration analysis system according to claim 7, wherein the output control portion causes the display to display time-series data of the first Mahalanobis distance and time-series data of the second Mahalanobis distance.

9. The vibration analysis system of claim 1, wherein the operating object is a pump.

10. A vibration analysis method comprising:

receiving an input of a vibration signal detected by a sensor attached to an operating object;

calculating a plurality of signal intensities corresponding to a plurality of frequency bands by analyzing the vibration signal corresponding to the object;

calculating a first Mahalanobis distance of a first signal space configured of the plurality of signal intensities with respect to a previously-set first unit space;

calculating two-dimensional gravity center data indicating gravity center positions of the calculated plurality of signal intensities;

calculating a second Mahalanobis distance of a second signal space configured of the two-dimensional gravity center data with respect to a previously-set second unit space;

predicting an abnormality generation period at which an abnormality is generated in the object based on the first Mahalanobis distance and the second Mahalanobis distance; and at least one of advancing maintenance preparation for the object responsive to the first Mahalanobis distance exceeding a first threshold or starting maintenance on the object responsive to the second Mahalanobis distance exceeding a second threshold.

11. The method of claim 10, wherein the operating object is a pump.

* * * * *